United States Patent
Hsieh et al.

(10) Patent No.: US 9,960,444 B2
(45) Date of Patent: May 1, 2018

(54) SEMI-VANADIUM REDOX FLOW BATTERY USING ELECTROLYTES OF VANADIUM IONS AND IODINE-VITAMIN C

(71) Applicant: Institute of Nuclear Energy Research, Atomic Energy Council, Executive Yuan, R.O.C., Taoyuan (TW)

(72) Inventors: Chin-Lung Hsieh, Taoyuan (TW); Shu-Ling Huang, Miaoli County (TW); Tz-Jiun Tsai, New Taipei (TW); Ming-Wei Hsueh, Kaohsiung (TW); Mei-Ling Chen, Miaoli County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 191 days.

(21) Appl. No.: 14/741,590

(22) Filed: Jun. 17, 2015

(65) Prior Publication Data
US 2016/0372776 A1    Dec. 22, 2016

(51) Int. Cl.
*H01M 8/18* (2006.01)
*H01M 4/92* (2006.01)
(Continued)

(52) U.S. Cl.
CPC ......... *H01M 8/188* (2013.01); *H01M 4/8605* (2013.01); *H01M 4/8657* (2013.01);
(Continued)

(58) Field of Classification Search
CPC .......... H01M 8/188; H01M 8/12; H01M 8/18; H01M 4/92; H01M 4/8675; H01M 4/8657;
(Continued)

(56) References Cited

U.S. PATENT DOCUMENTS

2001/0028977 A1 * 10/2001 Kazacos ............. B60L 11/1879
429/105
2011/0135967 A1 * 6/2011 Pellissier ................ H01M 8/16
429/2

(Continued)

FOREIGN PATENT DOCUMENTS

WO    WO 2014197842 A1 * 12/2014 ............ H01M 8/188

*Primary Examiner* — Eugenia Wang
(74) *Attorney, Agent, or Firm* — Jackson IPG PLLC; Demian K. Jackson

(57) ABSTRACT

A semi-vanadium(V) redox flow battery (semi-VRFB) including a positive electrolyte tank, a negative electrolyte tank and a cell stack. The positive electrolyte tank is stored with a positive electrolyte of V ions and the negative electrolyte tank is stored with a negative electrolyte of iodine(I)-vitamin C. The cell stack comprises a positive electrode, a negative electrode, an insulating film, a positive electrode plate, and a negative electrode plate. The negative electrode is made of carbon (C) sandwiched with titanium dioxide($TiO_2$), and can further comprise a metal or an alloy. The insulating film is located between the positive electrode and the negative electrode. The positive and negative electrode plates are located in front of the positive and negative electrodes, respectively. The positive and negative electrolytes flow through the positive and negative electrode plates to charge/discharge power by the electrochemical reactions of V ions and I-vitamin C at the positive and negative electrodes.

1 Claim, 5 Drawing Sheets

(51) Int. Cl.
*H01M 4/86* (2006.01)
*H01M 4/90* (2006.01)

(52) U.S. Cl.
CPC ....... *H01M 4/8673* (2013.01); *H01M 4/9016* (2013.01); *H01M 4/92* (2013.01); *H01M 2004/8684* (2013.01); *Y02E 60/528* (2013.01)

(58) Field of Classification Search
CPC ............ H01M 4/8605; H01M 4/9016; H01M 2004/8684; Y02E 60/528
See application file for complete search history.

(56) References Cited

U.S. PATENT DOCUMENTS

| | | | |
|---|---|---|---|
| 2011/0253553 A1* | 10/2011 | Bergstein Freiberg | H01M 10/365 205/619 |
| 2015/0349369 A1* | 12/2015 | Li | H01M 8/188 429/447 |
| 2016/0141694 A1* | 5/2016 | Soloveichik | H01M 8/188 429/500 |

* cited by examiner

SEMI-VANADIUM REDOX FLOW BATTERY USING ELECTROLYTES OF VANADIUM IONS AND IODINE-VITAMIN C

TECHNICAL FIELD OF THE INVENTION

The present invention relates to a semi-vanadium (V) redox flow battery (semi-VRFB); more particularly, relates to making an electrode through an electroless plating method and sol-gel process for obtaining a highly efficient semi-VRFB using a negative electrolyte of iodine (I)-vitamin C and a positive electrolyte of V ions ($VO^{2+}/VO_2^+$).

DESCRIPTION OF THE RELATED ARTS

Among today's global development of energy storage technologies, redox flow battery (RFB) has many advantages as comparing to the other related technologies. For example, RFB has small electrochemical polarization for 100% discharging; has a long storage life; has mutually independent rated power and capacity; can improve battery capacity by increasing electrolyte amount or electrolyte concentration; and can freely design storage form and shape according to storage place.

One of the main advantages of RFB is the flexibility on charging and discharging. The battery can be fully discharged without harm, which is a decisive advantage that the current lead-acid battery can not achieve.

Although RFBs have series of vanadium (V)/bromine (Br), all V, sodium polysulfide/Br, etc., they are still in demonstration for verifying their effectiveness and long-term stability. Yet, all-V redox flow battery (all-VRFB) especially has the potential for commercial use. All-VRFB uses different valences of V ions as the active materials for positive and negative electrode reactions, where the V ions are dissolved in sulfuric acid solutions having certain concentrations. An ion exchange membrane is set between the positive and negative electrodes to separate the battery into two independent half-batteries. In general, for all-VRFB, the positive redox couple is $VO^{2+}/VO_2^+$ and the negative one is $V^{2+}/V^{3+}$. Because the two half-batteries of all-VRFB both use V substance, the pollution caused by the inter-crossing of electrolytes through the proton exchange membrane is solved. Therefore, in recent years, the international energy communities increasingly put emphasis on developing all-VRFB.

However, all-VRFB still has some technical problems. First of all, the pentavalent V in the positive solution of all-VRFB may easily precipitate vanadium pentoxide while the solution is stayed still or stayed under a temperature higher than 45 Celsius degrees; the precipitation may block channel, coat the carbon fiber felt and further worsen the performance of the cell stack until the cell stack scraps; and the temperatures of the electrolytes may be very easily heated up to over 45 degrees Celsius in the long run. Secondly, the graphite plate is etched by the positive solution. If the user operates properly, the graphite plate can be used for two years. If the user does not operate properly, one time of charging can make the graphite plate completely etched and the stack can only be abandoned. Therefore, under normal use, maintenance should be carried out by a professional for every two months and, as a result, the high-frequency maintenances are costly and laborious.

In addition, cost of all-VRFB is too high. In a five kilowatts battery, for example, the cost is four hundred thousand or more, which is several times higher than the cost of the same size lead-acid battery. Moreover, all-VRFB often has a very large volume. For storing the same energy, ten times or even tens times of volume or weight is needed, which is not suitable for a mobile device or a car, as comparing to a lithium battery.

Furthermore, the vanadium compounds are toxic, including the raw materials used in the electrolytes. From the environmental point of view, all-VRFB is completely environmentally unfriendly. For example, the precipitated material at the positive electrode and the thin layer formed after the positive electrolyte leaks have the same substance—which is namely vanadium pentoxide and is a highly toxic chemical.

Hence, the prior arts do not fulfill all users' requests on actual use.

SUMMARY OF THE INVENTION

The main purpose of the present invention is to reduce the use amount of V salt, reduce the economic costs and fabricate an electrode at an I-vitamin C end through an electroless plating method and sol-gel process for increasing duel-electric-layer charging capacitance and diffusion coefficient.

Another purpose of the present invention is to increase voltage through a set of paralleled batteries with efficiency of the whole battery set kept at a certain level.

To achieve the above purposes, the present invention is a highly efficient semi-VRFB, comprising a positive electrolyte tank, a negative electrolyte tank and a cell stack, where the positive electrolyte tank is stored with a positive electrolyte of V ions; the positive electrolyte tank is stored with a negative electrolyte of I-vitamin C; the cell stack comprises a positive electrode, a negative electrode, an insulating film, a positive electrode plate and a negative electrode plate; the negative electrode is made of carbon and titanium dioxide; the insulating film is located between the positive electrode and the negative electrode; the positive electrode plate is located at an end of the cell stack and adhered to the positive electrode; the negative electrode plate is located at another end of the cell stack and adhered to the negative electrode; and the positive electrolyte and the negative electrolyte flow through the cell stack with coordination of V ions and I-vitamin C respectively existing in the positive electrolyte and the negative electrolyte for charging and discharging through electrochemical reactions.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
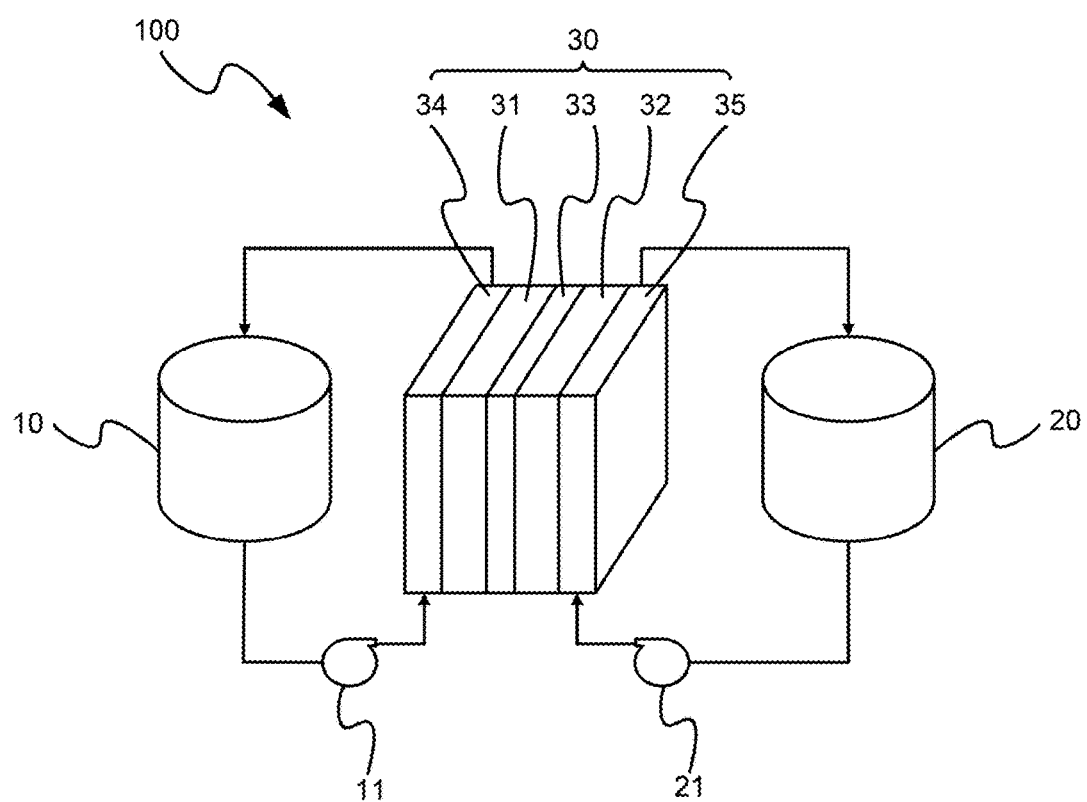
FIG. 1 is the structural view showing the preferred embodiment according to the present invention.
Figure 2A:
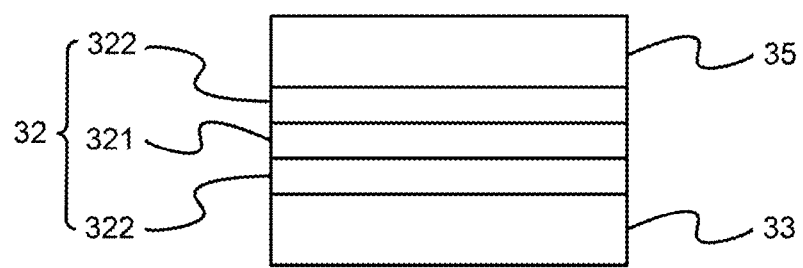
FIG. 2A is the structural view showing the first state-of-use of the negative electrode.
Figure 2B:
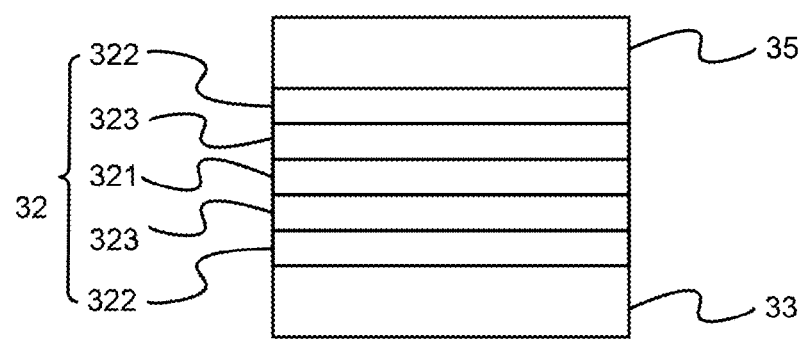
FIG. 2B is the structural view showing the second state-of-use of the negative electrode.
Figure 2C:
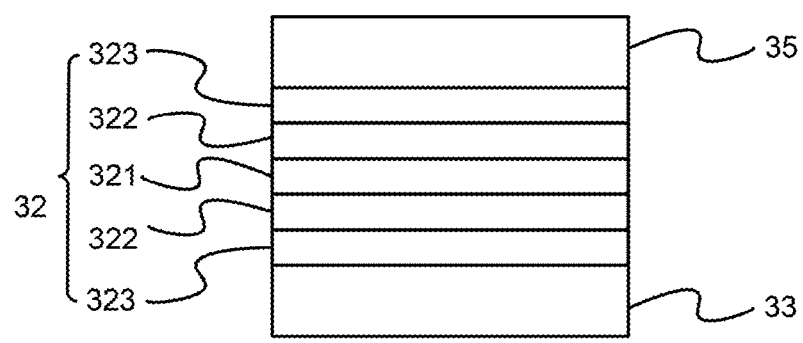
FIG. 2C is the structural view showing the third state-of-use of the negative electrode.
Figure 3:
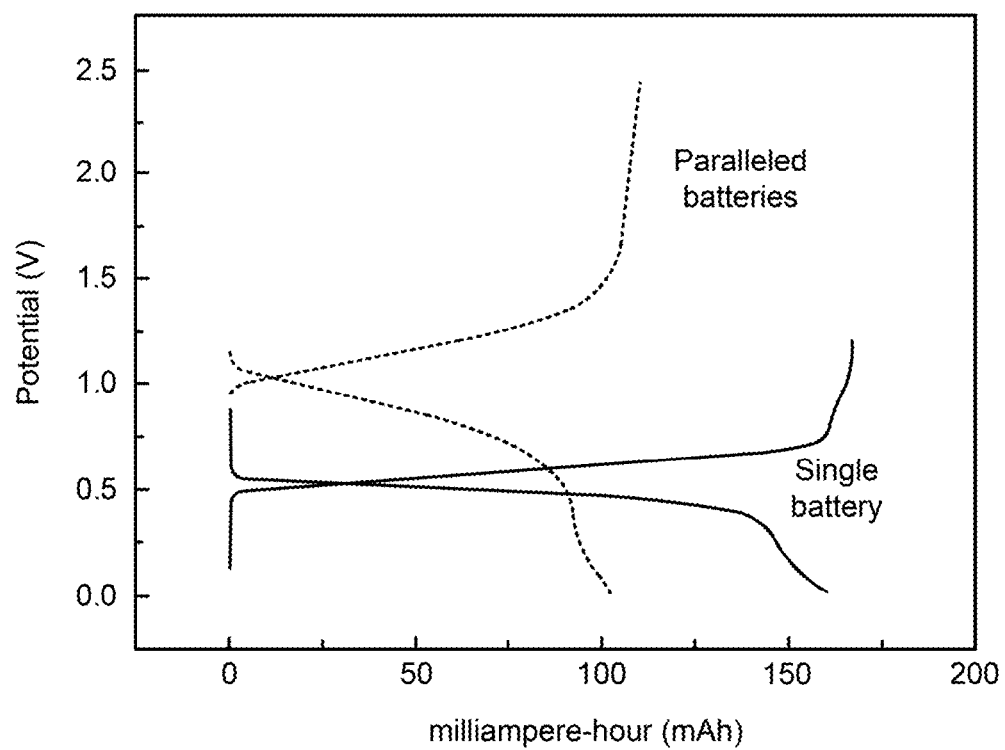
FIG. 3 is the structural view showing charging and discharging statuses of the single battery and the parallel-battery set.

Please refer to FIG. 1~FIG. 3, which are a structural view showing the preferred embodiment according to the present invention; structural views showing a first, a second and a third state-of-uses of a negative electrode; and a structural view showing charging and discharging statuses of a single battery and a parallel-battery set. As shown in the figures, the present invention is a highly efficient semi-vanadium (V) redox flow battery (semi-VRFB) 100, comprising a positive electrolyte tank 10, a negative electrolyte tank 20, and a cell stack 30.

The positive electrolyte tank 10 is stored with a positive electrolyte of V ions.

The negative electrolyte tank 20 is stored with a negative electrolyte of iodine (I)-vitamin C.

The cell stack 30 comprises a positive electrode 31, which is made of carbon felt, carbon paper or graphite felt; a negative electrode 32, which contains carbon (C) and titanium dioxide (TiO2)/metal or alloy; an insulating film 33, which is set between the positive electrode 31 and the negative electrode 32; a positive electrode plate 34, which is set in front of the positive electrode 31; and a negative electrode plate 35, which is set in front of the negative electrode 31.

The positive electrolyte and the negative electrolyte flow through the cell stack 30 for charging and discharging through electrochemical reactions with coordination of V ions and I-vitamin C respectively existing in the positive electrolyte and the negative electrolyte. Thus, a novel highly efficient semi-VRFB is obtained.

The present invention can further comprise an anode circulating pump 11 connected with the positive electrode tank 10 and a cathode circulating pump 21 connected with the negative electrode tank 20, where the positive electrolyte and the negative electrolyte are respectively transmitted to the positive electrode plate 34 and the negative electrode plate 35 by the anode and the cathode circulating pumps 11,21.

In a first state-of-use shown in FIG. 2A, the negative electrode 32 is a set of layers of $TiO_2/C/TiO_2$. Therein, the layers of $TiO_2$ 322 are separately set at a front end adhered to the insulating film 33 and at a rear end adhered to the negative electrode plate 35; and, the layer of C 321 is set between the layers of $TiO_2$ 322.

In a second state-of-use shown in FIG. 2B, the negative electrode 32 is a set of layers of $TiO_2$/palladium (Pd)/C/Pd/$TiO_2$. Therein, the layers of $TiO_2$ 322 are separately set at a front end adhered to the insulating film 33 and at a rear end adhered to the negative electrode plate 35; the layers of Pd 323 are set between the layers of $TiO_2$ 322 and the layer of C 321; the layer of C 321 is set between the layers of Pd 323; and, the layers of Pd 323 can be layers of another metal or alloy.

In a third state-of-use shown in FIG. 2C, the negative electrode 32 is a set of layers of Pd/$TiO_2$/C/$TiO_2$/Pd; the layers of Pd 323 are separately set at a front end adhered to the insulating film 33 and at a rear end adhered to the negative electrode plate 35; the layers of $TiO_2$ 322 are set between the layers of Pd 323 and the layer of C 321; and, the layer of C 321 is located between the layers of $TiO_2$ 322.

On using the present invention, the electrolyte of I-vitamin C and the electrolyte of V ions are used as a negative electrolyte ($V^{3+}/V^{2+}$) and a positive electrolyte ($VO^{2+}/VO_2^+$) to form the semi-VRFB 100. The electrode at the I-vitamin C end can be made of $TiO_2/C/TiO_2$, Pd/$TiO_2$/C/$TiO_2$/Pd or $TiO_2$/Pd/C/Pd/$TiO_2$ through an electroless plating method and sol-gel process, so that the present invention achieves large surface area of effective response and high chemical activity with the cell stack effectively enhanced in voltage and efficiency.

In Table 1, as the electrode is made through the electroless plating method and sol-gel process, its duel-electric-layer charging capacitance ($C_d$) and diffusion coefficient ($D_0$) are significantly increased, which can indeed improve the effective reaction area between the electrodes and the electrolyte for achieving great efficiency. A liquid layer is set at a place closest to the electrode surface for preventing the impact of flows. The electrolytes can reach the electrode surface by way of diffusion only. Thus, a high diffusion coefficient ($D_0$), in another word a high diffusing speed, is obtained to increase a reaction current. In addition, when a duel-electric-layer charging capacitor ($C_d$) has a higher value, the effective area between the electrode and the electrolytes becomes larger for meeting the requirement of storing energy.

TABLE 1

| Specimen | $D_0$ (cm$^2$/s) | $C_d$ (F/cm$^2$) |
| --- | --- | --- |
| C | $2.32 \times 10^{-6}$ | 0.198 |
| C/Pd | $3.25 \times 10^{-5}$ | 0.271 |
| C/Pd/$TiO_2$ | $2.59 \times 10^{-5}$ | 0.361 |
| C/$TiO_2$/Pd | $2.19 \times 10^{-3}$ | 0.478 |

In Table 2, coulombic efficiencies (CEs), voltage efficiencies (VEs) and energy efficiencies (EEs) of a single battery and a parallel-battery set are shown. Therein, the maximum CEs are separately 96% and 92% and the minimum EEs are separately 84% and 67%, which prove the charging and discharging capacities required for energy-storing batteries. In FIG. 3, the voltage is increased from original 1 volt to 2.5 volt, which means feasibility of developing a set of paralleled batteries.

TABLE 2

| Efficiency (%) | Single battery | Paralleled batteries |
| --- | --- | --- |
| CE | 96 | 92 |
| VE | 87 | 73 |
| EE | 83 | 67 |

Hence, the present invention, a semi-VRFB, can reduce the use amount of V salt with the economic cost saved. The electroless plating method and sol-gel process is used to fabricate the electrode at the I-vitamin C end to increase the electrochemical properties of diffusion coefficient and duel-electric-layer charging capacitance. Besides, the present invention can be a set of paralleled batteries to increase voltage with the overall efficiency remained at a certain level.

To sum up, the present invention is a highly efficient semi-VRFB, where the present invention can reduce the use amount of V salt with economic cost saved; an electrode at an I-vitamin C end can be made of $TiO_2/C/TiO_2$, Pd/$TiO_2$/C/$TiO_2$/Pd or $TiO_2$/Pd/C/Pd/$TiO_2$ through an electroless plating method and sol-gel process for increasing diffusion coefficient and duel-electric-layer charging capacitance; and the present invention can be a set of paralleled batteries for increasing voltage with the overall efficiency remained at a certain level.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A semi-vanadium (V) redox flow battery (semi-VRFB), comprising:
- a positive electrolyte tank stored with a positive electrolyte of V ions;
- an anode circulating pump connected with the positive electrolyte tank;
- a negative electrolyte tank stored with a negative electrolyte of iodine (I)-vitamin C;
- a cathode circulating pump connected with the negative electrolyte tank; and
- a planar cell stack consisting of:
  - a planar positive electrode made of carbon felt, carbon paper, or graphite felt;
  - a planar negative electrode made of carbon (C) sandwiched with palladium (Pd) sandwiched with titanium dioxide($TiO_2$) so as to form a set of planar layers $TiO_2$/Pd/C/Pd/$TiO_2$ or of C sandwiched with $TiO_2$ sandwiched with Pd so as to form a set of planar layers Pd/$TiO_2$/C/$TiO_2$/Pd;
  - a planar insulating film located between said planar positive electrode and said planar negative electrode and adhered to a front end layer of $TiO_2$ or Pd respectively of said planar negative electrode;
  - a planar positive electrode plate adhered to said planar positive electrode opposite said planar insulating film; and
  - a planar negative electrode plate located at a rear end of said planar cell stack and adhered to a rear end layer of $TiO_2$ or Pd respectively of said planar negative electrode, wherein said positive electrolyte and said negative electrolyte flow through said cell stack to charge and discharge through electrochemical reactions with coordination of V ions and I-vitamin C respectively existing in said positive electrolyte and said negative electrolyte.

* * * * *